(12) United States Patent
Kwon et al.

(10) Patent No.: US 7,060,332 B2
(45) Date of Patent: Jun. 13, 2006

(54) LIQUID CRYSTAL DISPLAY WITH ALIGNMENT FILM OF POLYPHENYLENPHTHALAMIDE-BASED MATERIAL AND METHOD FOR FABRICATING THE SAME

(75) Inventors: Soon Bum Kwon, Kyonggi-do (KR); Man Hoan Lee, Seoul (KR); Su Hyun Park, Kyonggi-do (KR); Yuriy Reznikov, Kiev (UA); Yuriy Kurioz, Kiev region (UA); Igor Gerus, Kiev (UA)

(73) Assignee: LG.Philips LCD Co., Ltd., Seoul (KR)

( * ) Notice: Subject to any disclaimer, the term of this patent is extended or adjusted under 35 U.S.C. 154(b) by 222 days.

(21) Appl. No.: 10/128,556

(22) Filed: Apr. 24, 2002

(65) Prior Publication Data

US 2002/0182346 A1    Dec. 5, 2002

(30) Foreign Application Priority Data

Apr. 25, 2001   (KR) .............................. P2001-22278

(51) Int. Cl.
C09K 19/02 (2006.01)
G02F 1/13337 (2006.01)

(52) U.S. Cl. .................. 428/1.25; 428/1.2; 349/123
(58) Field of Classification Search ............. 428/1.2, 428/1.25, 1.1, 1.26, 1.3; 349/123
See application file for complete search history.

(56) References Cited

U.S. PATENT DOCUMENTS

| | | | | |
|---|---|---|---|---|
| 3,063,966 A | * | 11/1962 | Kwolek et al. ............. | 528/336 |
| 3,869,429 A | * | 3/1975 | Blades ..................... | 528/341 |
| 4,070,433 A | * | 1/1978 | Miyoshi et al. ............ | 264/233 |
| 4,539,393 A | * | 9/1985 | Tamura et al. ............. | 528/348 |
| 4,857,255 A | * | 8/1989 | Imanishi et al. ........... | 264/216 |
| 4,974,941 A | | 12/1990 | Gibbons et al. | |
| 5,032,009 A | | 7/1991 | Gibbons et al. | |
| 5,067,797 A | * | 11/1991 | Yokokura et al. .......... | 349/124 |
| 5,389,698 A | | 2/1995 | Chigrinov et al. | |
| 5,464,669 A | | 11/1995 | Kang et al. | |
| 5,538,823 A | | 7/1996 | Park et al. | |
| 5,656,340 A | | 8/1997 | Ubukata et al. | |
| 5,681,624 A | * | 10/1997 | Moriya ..................... | 428/1.6 |
| 5,705,096 A | | 1/1998 | Kano et al. | |
| 5,767,994 A | | 6/1998 | Kang et al. | |
| 5,814,711 A | * | 9/1998 | Choe et al. ............... | 525/431 |
| 5,824,377 A | | 10/1998 | Pirwitz et al. | |
| 5,928,561 A | | 7/1999 | Bryan-Brown et al. | |
| 6,057,900 A | * | 5/2000 | Ono et al. ................. | 349/110 |
| 6,103,862 A | * | 8/2000 | Noh ........................ | 528/332 |
| 6,281,957 B1 | * | 8/2001 | Oh et al. .................. | 349/141 |
| 6,808,766 B1 | * | 10/2004 | Miyama et al. ............ | 428/1.25 |

FOREIGN PATENT DOCUMENTS

| | | |
|---|---|---|
| EP | 0 525 473 A2 | 2/1993 |
| EP | 0 525 473 A3 | 2/1993 |
| EP | 0 525 473 B1 | 2/1993 |
| EP | 0 525 478 A2 | 2/1993 |
| EP | 0 525 478 A3 | 2/1993 |
| EP | 0 525 478 B1 | 2/1993 |
| EP | 0 611 786 A1 | 8/1994 |
| EP | 0 611 786 B1 | 8/1994 |
| EP | 0 705 384 B1 | 4/1996 |
| EP | 0 742 471 A2 | 11/1996 |
| EP | 0 742 471 A3 | 11/1996 |
| EP | 0 750 212 A2 | 12/1996 |
| EP | 0 750 212 A3 | 12/1996 |
| EP | 1111442 | * 6/2001 |
| JP | 06-025670 | * 2/1994 |
| WO | WO-0013058 | * 3/2000 |

OTHER PUBLICATIONS

Translation of Japanese Patent.*
Schadt et al. "Surface-Induced Parallel Alignment of Liquid Crystals by Linearly Polymerized Photopolymers." *Jpn. J. Appl. Phys.* vol. 31. 1992. pp. 2155-2164.
Schadt et al. "Optical Patterning of Multidomain LCDs." *Journal of the SID.* 1997. pp. 367-370.
Chen et al. "Model of Liquid Crystal Alignment by Exposure to Linearly Polarized Ultraviolet Light." *Physical Review E.* vol. 54, No. 2. Aug. 1996. pp. 1599-1603.
Baur et al. "Determination of the Tilt Angles at Surfaces of Substrates in Liquid Crystal Cells." *Physics Letters.* vol. 56A, No. 2. Mar. 8, 1976. pp. 142-144.
Cognard, Jacques. "Alignment of Nematic Liquid Crystals and Their Mixtures." *Molecular Crystals and Liquid Crystals.* 1982. pp. 1-36.
Nam et al. "Wide-Viewing Angle TFT-LCD with Photo-Aligned Four-Domain TN Mode." *Journal of the SID.* 1997. pp. 933-936.

* cited by examiner

*Primary Examiner*—Shean C. Wu
(74) *Attorney, Agent, or Firm*—McKenna Long & Aldridge LLP

(57) ABSTRACT

An LCD and a method for fabricating the LCD includes a first substrate and a second substrate, a liquid crystal layer between the first substrate and the second substrate, and a coating of a polyphenylenephthalamide based material on at least one of the substrates, thereby providing an LCD having a reduced residual image, a strong anchoring energy, and a high thermal stability is achieved.

18 Claims, 2 Drawing Sheets

LIQUID CRYSTAL DISPLAY WITH ALIGNMENT FILM OF POLYPHENYLENPHTHALAMIDE-BASED MATERIAL AND METHOD FOR FABRICATING THE SAME

This application claims the benefit of the Korean Application No. P2001-22278 filed on Apr. 25, 2001, which is hereby incorporated by reference for all purposes as if fully set forth herein.

BACKGROUND OF THE INVENTION

1. Field of the Invention

The present invention relates to a liquid crystal display, and more particularly, to an alignment film for aligning the liquid crystal (LC) in liquid crystal display (LCD).

2. Background of the Related Art

Liquid crystals (LC) are liquids consisting of anisotropic molecules. The average direction of the long molecular axis is named as director of the LC. The director distribution in the bulk LC is determined according to its anchoring on rigid substrates and is characterized by the direction of the axis of easy director orientation corresponding to the minimum LC surface energy, and an anchoring energy.

Reorientation of the director under the action of an applied external electric field form the operational basis of LC devices. The basic unit of the LC devices—displays in particular—includes an LC cell that consists of LC material provided between two rigid substrates. In order to obtain uniform brightness and a high contrast ratio within the LC display, homogeneous alignment of LC material in the cell is necessary.

Many materials are well known for their abilities to homogenously align LC materials. Polyimide, polyamide and polysilicone polymers are well known materials that may provide high quality, uniaxial, thermostable alignment of various LC mixtures. To obtain mono-domain planar alignment of LC material on the aforementioned polymers, a special mechanical surface treatment (e.g., stretching, microgroove formation, mechanical rubbing) is required. Rubbing processes can provide high quality, strong alignment of LC materials, wherein orientation is determined according to the direction of rubbing. However, the aforementioned techniques have some drawbacks. In particular, microgrooves inherently contain defects that cause random phase distortions and scatter light, thereby degrading display characteristics. Static electricity generated during the rubbing of the polymer surface is also known to generate dust and cause defects in active matrix LC displays. Moreover, it is very difficult to selectively orient selected regions of an LC surface so that each region has different orientation.

Other techniques that do not use mechanical treatment of the surface are also known. These other techniques include oblique evaporation of inorganic materials on a substrate, use of anisotropic Langmuir-Blodgett (LB) films, and anisotropic adsorption of LC molecules in a magnetic field. These techniques provide adequate homogeneous alignment but are complex and have low alignment reliability.

Another non-mechanical alignment technology includes photoalignment of liquid crystals. In photoalignment, LC material is aligned according to an anisotropic surface produced during a photochemical reaction under polarized UV light. LC material is oriented unidirectionally on the irradiated surface, and liquid crystal orientation is determined by the direction of polarization of UV light. A number of alignment film materials have been developed for photoalignment of LC materials. For example, polyvinylcinnamates (PVCN), polysiloxancinnamates (PSCN), cellulose cinnamates (CCN), coumarin-containing polyacrylates (CCP), and polyimides (PI) have been used in photoalignment technology.

The capability of photoaligning materials to align LC material is provided by appearance of the anisotropy on the surface due to irradiation of the UV light. For example, anisotropy in cinnamoyl-containing polymers is caused by a photo-crosslinking reaction. When exposed to incident light, side cinnamoyl fragments parallel to the polarization of the incident light efficiently undergo photo-crosslinking. Anisotropy in PIs is created by the photo-destruction of main PI chains. When exposed to incident light, photosensitive PI fragments parallel to the polarization of the incident light are efficiently destroyed.

The aforementioned photoaligning materials may provide adequately homogenous planar and tilted alignment of standard LC mixtures for twist-and-vertical mode LC cells (a technique used in manufacturing LC cells of display devices.

The problem that prevents wide application of photoalignment techniques in LCD manufacture, however, is a residual effect (i.e., conservation of a previous image on the display after a change of the image on the screen) introduced by conventional alignment films.

In the case of the cinnamoyl-containing materials, the modification of polymer surface by LC molecules and their reorientation in electric field induces the residual effect. Cinnamoyl-containing materials are known to provide low anchoring energy ($W<10^{-2}$ $erg/cm^{-2}$). The reorientation of the director on the aligning surface is essential and flexible fragments of polymer (e.g. non-crosslinked cinnamoyl-fragments) follows the director reorientaion in an electric field. Therefore, the residual effect is induced because both the easy axis and the anchoring energy of the aligning layer are altered in an electric field.

PI materials usually have no flexible side groups and their surfaces are much more rigid. Nevertheless, these photoaligning materials also possess a strong residual effect. The origin of this effect is a screening of the applied electric field due to a double charged layer near the irradiated PI surface. The double charged layer appears due to generation of electric charges in PI during UV exposure.

SUMMARY OF THE INVENTION

Accordingly, the present invention is directed to a liquid crystal display, and a method for fabricating the same that substantially obviates one or more of the problems due to limitations and disadvantages of the related art.

An advantage of the present invention is to provide a liquid crystal display in which an alignment film is formed of a photosensitive material having a low residual effect, a strong anchoring energy, and a high thermal stability.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the LCD includes a first substrate and a second substrate, a liquid crystal layer between the first substrate and the second substrate, and an alignment film of polyphenylenephthalamide (3P) based material formed on at least one of the substrates.

3P-based materials exhibit a rigid surface having no flexible cinnamoyl groups that do not induce a double charged electric layer in a LC cell. The materials used in the alignment film of the present invention provide a high quality planar and tilted alignment of commercial nematic mixtures. LC alignment on the 3P-based material is characterized by a low residual parameter, strong anchoring energy, and high thermostability.

The polyphenylenephthalamide based material may be prepared by reacting phenylenediamine based materials with phthaloyl chloride based materials.

The phenylenediamine based material of the present invention includes at least one isomer configuration selected from the group consisting of 1,3- and 1,4-isomer configurations, wherein a ratio of 1,4- to 1,3-isomers ranges between 0% and 100%. The phenylenediamine based material may be characterized by the following chemical formula:

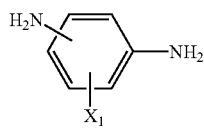

The substituent $X_1$ is at least one selected from the group consisting of H, F, Cl, CN, $CF_3$, $OCF_3$, $C_nH_{2n+1}$, and $OC_nH_{2n+1}$, where n=1–10.

The phthaloyl chloride based material comprises at least one isomer configuration selected from the group consisting of 1,3- and 1,4-isomer configurations, wherein a ratio of 1,4- to 1,3-isomers ranges between 0% and 100%. The phthaloyl chloride based material is characterized by the following chemical formula:

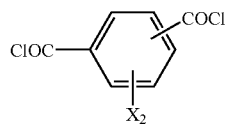

The substituent $X_2$ is at least one selected from the group consisting of H, F, Cl, CN, $CF_3$, $OCF_3$, $C_nH_{2n+1}$, or $OC_nH_{2n+1}$, where n=1–10.

The phthaloyl chloride based material may be prepared from a phthalic acid based material, according to the following process:

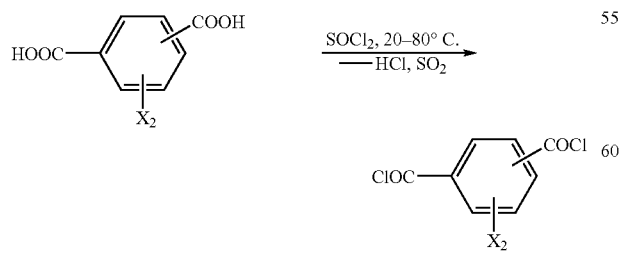

Particularly, the polyphenylenephthalamide based material is prepared according to the following process:

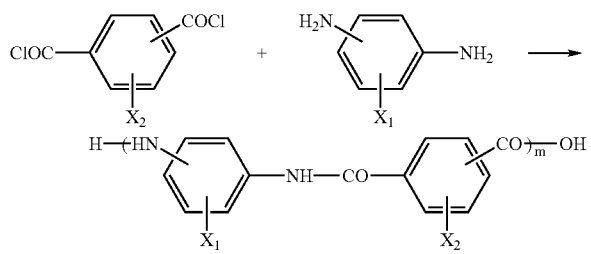

The substituents $X_1$ and $X_2$ are each selected from the group consisting of H, F, Cl, CN, $CF_3$, $OCF_3$, $C_nH_{2n+1}$, and $OC_nH_{2n+1}$, where n=1–10 and m is about 50–500.

The 3P-based material may be prepared by reacting a phenylenediamine based material with a phthaloyl chloride based material in an inert solvent such as dimethylformamide, dimethyacetamide, and dimethylsulfoxide, in the presence, or non-presence of a base such as triethylamine, pyridine, or the like; diluting the reaction mixture with methanol, filtering, drying in a vacuum, and then milling in a vibrating mill.

Alternatively, the 3P-based material can be prepared according to emulsion polycondensation of a phenylenediamine based material with a phthaloyl chloride based material, in a water-organic solvent mixture under presence of a base such as potassium carbonate, or sodium carbonate, and subjecting the reaction mixture to filtering, washing, drying under a vacuum, and then milling in a vibrating mill.

The polyphenylenephthalamide based material prepared according to the above method is preferably one of polymers selected from a group of materials, including poly[N,N'-(1,3-phenylene)-5-isophthalamide], poly[N,N'-(1,4-phenylene)isophthalamide], poly[N,N'-(1,3-phenylene)terephthalamide], and mixtures thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to embodiments of the present invention, examples of which are illustrated in the accompanying drawings. The present invention suggests employing a polyphenylenephthalamide based material as an alignment film of an LCD.

Figure 1:
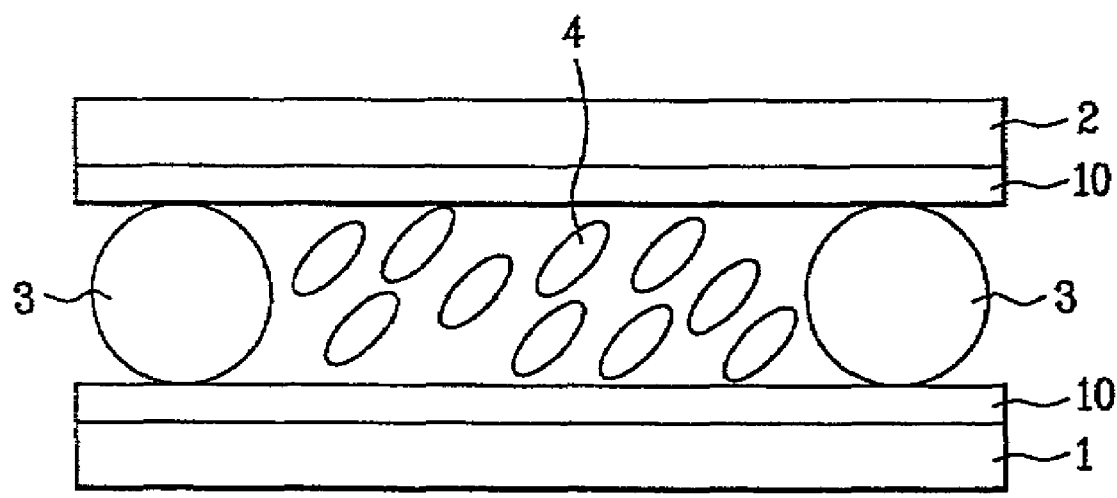
FIG. 1 illustrates a section of an LCD in accordance with a preferred embodiment of the present invention, schematically.

Referring to FIG. 1, the LCD in accordance with an embodiment of the present invention includes a first substrate 1 and a second substrate 2, a liquid crystal layer 4 between the first substrate 1 and the second substrate 2, and an alignment film 10 of a polyphenylenephthalamide based material on at least one of the substrates.

The first or second substrates may be formed of glass, quartz, or plastic. Additionally, a material used in the fabrication of chips, such as silicon, ITO, or $SnO_2$ may be coated onto the first or second substrates.

A gap of approximately 2 to 100 μm is formed between the two substrates due to the presence of spacer 3. The spacer 3 may be a polymer stripe, glass, or a cylindrically or spherically shaped polymer. Also, a patterned spacer (column spacer) may be alternatively used.

The liquid crystal material may be injected between the two substrates at an elevated temperature (wherein the LC material exists in an isotropic phase) or at room temperature (wherein the LC material exists in a mesophase). In an alternative method, the liquid crystal layer may be formed according to a dispensing method in which liquid crystal material is deposited on one of the substrates prior to a step of bonding the two substrates together. As LCD panels become larger, the two step alternative LC forming method shortens the time required for forming the liquid crystal layer, and also effectively forms a liquid crystal layer having high viscosity.

A method for fabricating an LCD in accordance with a first embodiment of the present invention includes providing a first substrate and a second substrate, forming a polyphenylenephthalamide based alignment film on at least one of the substrates, and forming a liquid crystal layer between the first and second substrates.

The first substrate is provided by forming a thin film transistor (TFT) on the first substrate and forming a pixel electrode on the TFT. The second substrate is provided by sequentially forming a black matrix and a color filter layer on the second substrate.

Optionally, light may be irradiated onto the alignment film one or more times to control an alignment direction and a pre-tilt angle of the liquid crystal layer.

Materials and fabricating methods of the substrates, the thin film transistors, the pixel electrodes, the black matrix, the color filters, and the like may be varied within the scope of the invention and may be readily apparent to a person skilled in the field of the present invention.

As explained above, the liquid crystal layer may be formed by bonding the two substrates and injecting the liquid crystal through a liquid crystal injection hole, or by dropping the liquid crystal on the substrate and bonding the two substrates.

The method for forming the polyphenylenephthalamide based alignment film according to the present invention will now be explained.

The polyphenylenephthalamide based material, prepared according to the present invention, is first mixed with a solvent to form a mixed solution. The solvent is selected from a class of amides, for example, dimethyl-formamide, demethylacetamide, tetramethyluria, and the like, or dimethyl-sulfoxide, sulphalane, and the like. The solvent dissolves the polyphenylenephthalamide based material.

The solution is then deposited on at least one of the two substrates by a spin coating technique. Subsequently, the solvent is removed to form a film by vaporizing the deposited solution at room temperature, or at an elevated temperature, or using any other methods known to a person of ordinary skill in the field of the present invention.

The 3P-based film is then irradiated with light. The irradiating light of the present invention includes may be characterized according to various states of polarization (e.g., the irradiating light may be linearly polarized, elliptically polarized, partially polarized, non-polarized, or unpolarized). In one aspect of the present invention, the irradiating light may be linearly polarized and have a wavelength in the absorption of band of the 3P-based material. The absorption band of the 3P-based material has a peak absorption in the ultraviolet range. Accordingly, the irradiating light has a wavelength within a range of approximately 200 to approximately 300 nm and may be generated using a Hg- or Xe-lamp.

A method of irradiating light will be now explained in detail.

The surface of the alignment film may be normal or tilted with respect to the direction of the incident light irradiated upon it. Further, the surface of the alignment film may be irradiated once or many times by light of differing states of polarization. The direction of the incident light and its state of polarization control the pretilt direction and the pretilt angle of the alignment film.

The easy axis direction of the LC material is determined by, and is perpendicular to, the polarization direction of the irradiating light. Therefore, the easy axis direction may be locally varied across the alignment film by changing the polarization direction of the light anywhere between 0° and 360°. The anchoring energy of the alignment film is determined by the light intensity and amount of time the alignment film is irradiated by the light. Therefore, the anchoring energy may also be locally varied across the alignment film by changing the of the intensity of the light and the amount of time the surface alignment film is irradiated by the light. The anchoring energy of the alignment film in the present invention ranges between about $10^{-4}$ and about $10^{-2}$ erg/$cm^2$. Exposure time and light intensity varies widely depending on the materials and light source used. For example, the amount of time the surface of the alignment film is irradiated by the light may range from tens of seconds to several hours.

A mask may be placed over the alignment film prior to the optional step of irradiating. The mask may also be removed after the alignment film is irradiated with the light. The mask may be provided in any desired shape to provide an alignment film with a patterned irradiated surface.

Illustrated embodiments of the present invention will now be explained with reference to the attached drawings.

EXAMPLE 1

Preparation of 5-methoxyisophthaloyl Chloride

A mixture of about 0.05 mol of 5-methoxyisophthalic acid, about 20 ml to about 40 ml of excessive thionyl chloride, and about 0.2 ml of a catalyst dimethylformamide was kept at about 20° C. for about one day, and subsequently at about 80° C. for about six hours. The excessive thionyl chloride is then evaporated while the remainder of the reaction product is kept under vacuum (e.g., about 0.1 mmHg) at about 80° C. for about two hours to provide about a 95% yield of the 5-methoxyisophthaloyl chloride.

The following chloroanhydrides may be prepared by the aforementioned method. Isophthaloyl chloride, tetraphthaloyl chloride, 5-methoxyisophthaloyl chloride, 4-methoxyisophthaloyl chloride, 5-methylisophthaloyl chloride, 5-chloroisophthaloyl chloride, 5-fluoroisophthaloyl chloride, 4,5-difluoroisophthaloyl chloride, 5-propoxyisophthaloyl chloride, 5-pentoxyisophthaloyl chloride, 4-methly-5-methoxyisophthaloyl chloride, 5-heptyloxyisophthaloyl chloride, 2-methoxyisophthaloyl chloride, 5-nonyloxyisophthaloyl chloride, 5-fluoroterephthaloyl chloride, and 2-methylterephthaloyl chloride.

EXAMPLE 2

Preparation of poly[N,N'-(1,3-phenylene)-5-methoxyisophthalamide]

About 0.05 mol of 5-methoxyisophthaloyl chloride (as prepared in Example 1) is added to a mixture of about 0.05 mol of 1,3-phenylenediamine and about 0.15 mol of triethylamine in about 50 ml dimethylacetamide for about 10 minutes while stirring at a temperature of about −10° C. The reaction mixture is then warmed up to about 20° C. after about one hour at about −10° C., and diluted with methanol. The reaction product is then filtered, washed thoroughly with methanol and water, dried in a vacuum, and subsequently milled in a vibrating mill providing a final yield of poly[N,N'-(1,3-phenylene)-5-methoxyisophthalamide] of about 45–82%.

EXAMPLE 3

Preparation of Co-poly[N,N'-(1,3-phenylene)- and N,N'-(1,4-phenylene)-5-pentoxyphthalamide A solution of about 0.05 mol of 5-pentoxyisophthaloyl chloride (as prepared in Example 2) in about 30 ml tetrahydrofurane (THF) solvent is added to a mixture of about 0.03 mol of 1,3-phenylene, about 0.01 mol of 1,4-phenylene, and about 0.2 mol of $K_2CO_3$ in about 50 ml water and stirred vigorously at about 5° C. for about one minute. After about 15 min. at about 5° C., the reaction mixture is warmed up to about 20° C., and the reaction product is filtered, washed thoroughly with water and methanol, dried in a vacuum, and subsequently milled in a vibrating mill to produce a final yield of co-poly[N,N'-(1,3-phenylene)- and N,N'-(1,4-phenylene)-5-pentoxyphthalamide of about 57–89%.

EXAMPLE 4

Formation of a Polymer Alignment Film

Poly[N,N'-(1,3-phenylene)-5-methoxyisophthalamide] (as prepared in Example 2) is dissolved in dimethylformaldehyde solution having a concentration of about 20 g/l, and filtered. Using a measuring pipette, a drop of the solution is then placed in the center of a glass substrate coated with ITO. The substrate is then spun at a rotational speed of about 3000 rpm in a centrifuge for about 30 seconds. The spun-deposited film thus formed is then immediately pre-baked at about 160° C. for about one hour.

Figure 2:
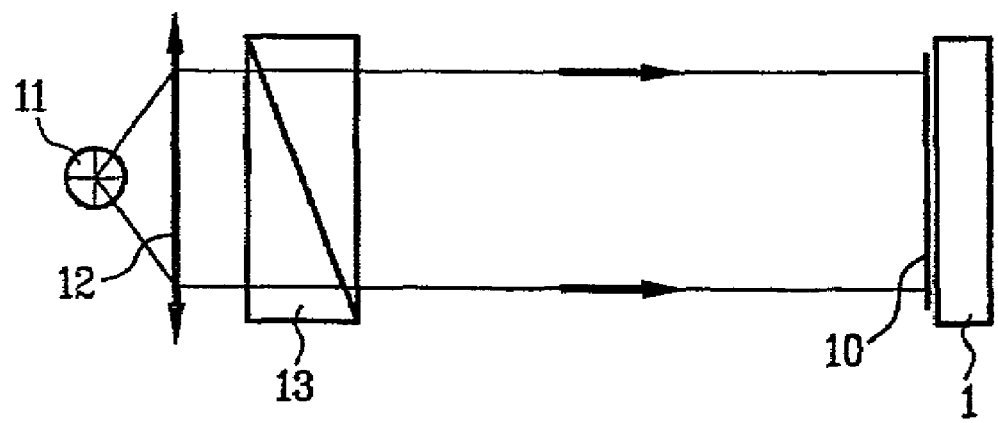
FIG. 2 illustrates a device for directing a light for forming a photo-alignment film of the present invention, schematically.

Referring to FIG. 2, a substrate 1 having exemplary dimensions of 0.2×3×2 cm, coated with the orienting film, is irradiated with a polarized UV light beam. UV rays having an average power of about 500W and a wavelength λ less than about 365 nm, are directed toward the substrate are formed using a mercury lamp 11 and a lens system 12. The UV rays are directed toward the substrate 1 through a polarizing Glan-Thompson prism 13, at a power density of about 5 mW/cm$^2$. One or more polarizers may be arranged between the lens system 12 and the Glan-Thompson prism 13 and/or between the Glan-Thompson 13 prism and the substrate to irradiate the alignment film with various states of polarized light. The polarizer(s) may, for example, include a stack of quartz substrates, glass substrates, or multiple inorganic films.

In one aspect of the present invention, UV rays irradiate the substrate twice. Accordingly, in an exemplary first irradiation step, UV light is perpendicularly incident on the surface of the alignment film, for a duration of about 25 minutes. In the first irradiation step, the polarization direction of the UV light is perpendicular to the incident plane of the beam. In an exemplary second irradiation step, UV light is obliquely incident (e.g., at an angle of about 45°) on the surface of the alignment film and the polarization direction, for a duration of about 30 seconds. In another aspect of the present invention, the polarization direction of the UV rays are in the incident plane of the beam. Alternately, UV rays may irradiate the alignment film only once. Accordingly, the polarization direction of the UV rays are oblique to the substrate plane and the UV rays may include partially polarized or elliptically polarized light.

Assembly of the LC Cell

Two substrates each having inwardly facing sides covered with alignment films, are set apart by a plurality of cylindrical polymer spacers having 5 μm diameter. Alignment films on the two substrates were exposed to identical light irradiation treatments. Subsequently, relying on the capillary phenomenon, an LC material exhibiting a nematic phase at room temperature (e.g., ZLI-4801) is injected between the substrates.

Test of a Fabricated LCD Cell

The LC cell fabricated according to the method of the present invention provides a high quality, homogeneous alignment of LC material. Testing of the LC cell in a polarized microscope reveals the direction of the easy axis on the alignment films to be perpendicular to the polarization of the light during the first exposure.

Measurement of the pretilt angle by rotation technique reveals that the pretilt angle of the liquid crystal alignment, $\phi=(1\pm0.2)°$.

The thermostability of the aligned LC material provided by the alignment film is verifiable, along with the quality of the alignment, by optical and electro-optical techniques. First, the electro-optical characteristic (i.e., the ratio of the cell transparency between cross and parallel polarizers) and the surface density of orientational defects may be measured in a twist type LC cell containing the 3P-based material alignment film. Second, the cell is heated to a temperature of about 120° C. for about 4 hours and no changes in the above noted characteristics of the LC cell are evidenced following cooling of the cell to room temperature.

The residual effect is then measured in the twist type LC cell using an alignment film fabricated according to Example 4. The substrates may be set so that the incident light polarization on the substrates during the first exposure are perpendicular. The cell is then placed between parallel polarizers and normally black mode is realized.

The residual parameter of the cell can be determined as follows.
1. Hold the cell in a short-circuit state for one minute.
2. Measure a first transmittance, ΔT, of the cell in an AC-electric field at a frequency of 1000 Hz and at a voltage ranging between 0 and 5V.

3. Measure a second transmittance, Tmax, of the cell in an AC-electric field at a frequency of 1000 Hz and at a voltage of 5V for 30 minutes 4. Calculate the residual parameter, S where S=ΔT/Tmax. Accordingly, Tmax denotes a maximum transmittance of the second transmittance, and ΔT denotes the maximum difference between the first and second transmittances.

Figure 3:
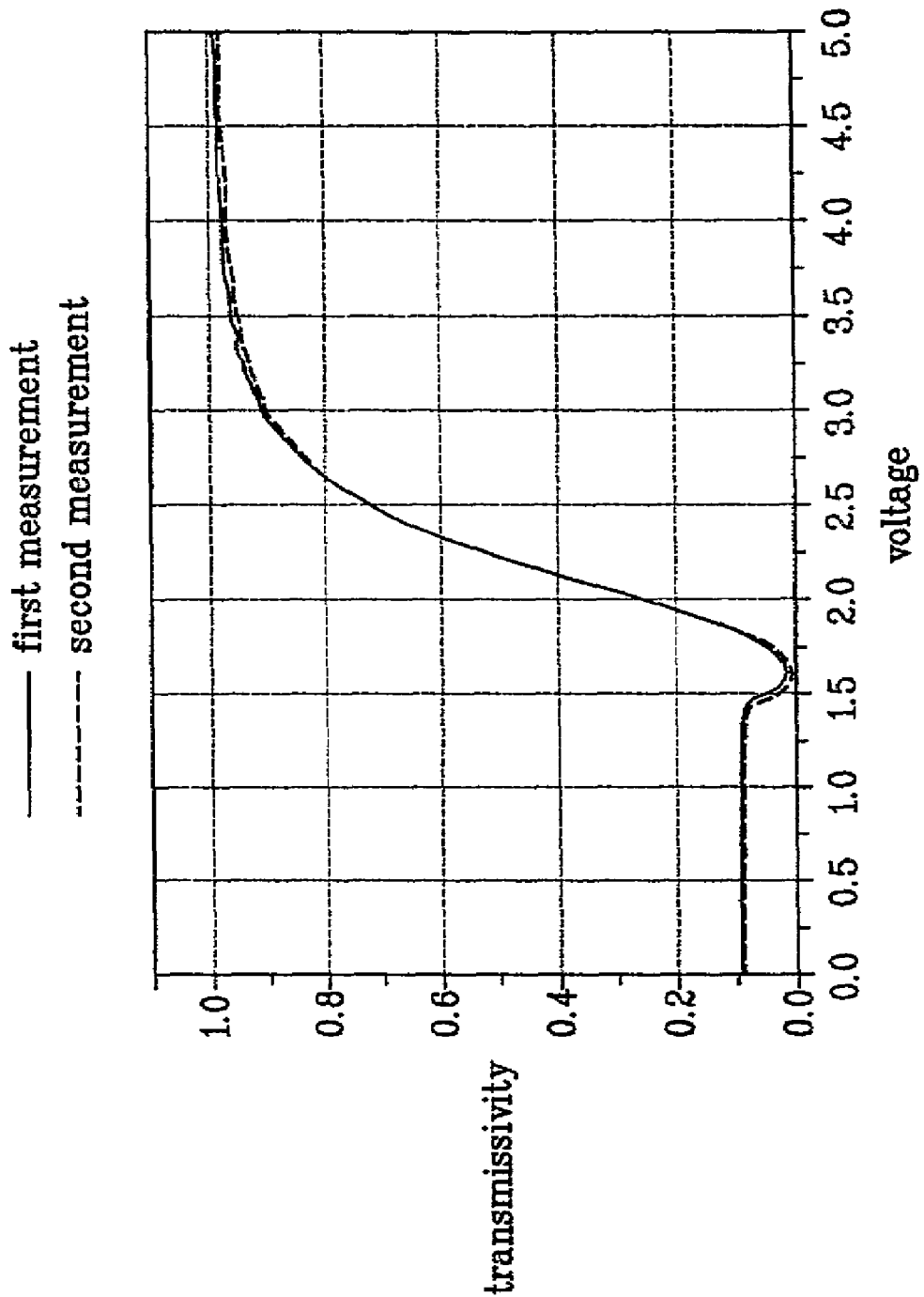
FIG. 3 illustrates a graph showing T-V (Transmittance-Voltage) characteristics of a liquid crystal cell fabricated in accordance with the present invention.

A graph showing the results of the testing in accordance with the method of the present invention is depicted in FIG. 3. The residual parameter, S, of the alignment film of the present invention is approximately 0.02. Analogous residual parameter measurements of cells having alignment films made of para-fluoro polyvinyl-cinnamate and 4-pentoxycinnamoyl cellulose acetate are 0.09 and 0.06, respectively.

Accordingly, the present invention provides an LC cell for use in an LCD formed with an alignment film made of a polyphenylenephthalamide based material that exhibits a low residual parameter, strong anchoring energy, and high thermal stability.

It will be apparent to those skilled in the art that various modifications and variations may be made in the LCD and in the method for fabricating the LCD herein described without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate and a second substrate;
   a liquid crystal layer between the first and second substrates; and
   an alignment film made of polyphenylenephthalamide based material on at least one of the first and second substrates, wherein the polyphenylenephthalamide based material is a product of a phenylenediamine based material reacted with phthaloyl chloride based material, wherein the phthaloyl chloride based material is characterized by the formula,

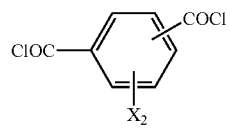

wherein $X_2$ is at least one selected from the group consisting of F, Cl, CN, $CF_3$, $OCF_3$, $C_nH_{2n+1}$, and $OC_nH_{2n+1}$, where n is a number between 1 and 10.

2. The liquid crystal display device of claim 1, wherein the phenylenediamine based material comprises at least one isomer configuration selected from the group consisting of 1,3- and 1,4-isomer configurations, wherein a ratio of 1,4- to 1,3-isomers ranges between 0% and 100%.

3. The liquid crystal display device of claim 2, wherein the phenylenediamine based material comprises at least one substituent selected from the group consisting of H, F, Cl, CN, $CF_3$, $OCF_3$, $C_nH_{2n+1}$, and $OC_nH_{2n+1}$, where n is a number between 1 and 10.

4. The liquid crystal display device of claim 1, wherein the phthaloyl chloride based material comprises at least one isomer configuration selected from the group consisting of 1,3- and 1,4-isomer configurations, wherein a ratio of 1,4- to 1,3-isomers ranges between 0% and 100%.

5. The liquid crystal display device of claim 4, wherein the phthaloyl chloride based material comprises at least one substituent selected from the group consisting of F, Cl, CN, $CF_3$, $OCF_3$, $C_nH_{2n+1}$, $OC_nH_{2n+1}$, where n is a number between 1 and 10.

6. The liquid crystal display device of claim 1, wherein the phthaloyl chloride based material is obtained from a phthalic acid based material.

7. The liquid crystal display device of claim 1, wherein the phthaloyl chloride based material comprises at least one material selected from a group consisting of tetraphthaloyl chloride, 5-methoxyisophthaloyl chloride, 4-methoxyisophthaloyl chloride, 5-methylisophthaloyl chloride, 5-chloroisophthaloyl chloride, 5-fluoroisophthaloyl chloride, 4,5-difluoroisophthaloyl chloride, 5-propoxyisophthaloyl chloride, 5-pentoxyisophthaloyl chloride, 4-methly-5-methoxyisophthaloyl chloride, 5-heptyloxyisophthaloyl chloride, 2-methoxyisophthaloyl chloride, 5-nonyloxyisophthaloyl chloride, 5-fluoroterephthaloyl chloride, and 2-methylterephthaloyl chloride.

8. The liquid crystal display device of claim 1, wherein the polyphenylenephthalamide based material comprises at least one polymer selected from the group consisting of poly[N,N'-(1,3-phenylene)-5-isophth-alamide], poly[N,N'-(1,4-phenylene)isophthalamide], and poly[N,N'-(1,3-phenylene)terephthalamide].

9. A liquid crystal display device comprising:
   a first substrate and a second substrate;
   a liquid crystal layer between the first and second substrates; and
   an alignment film of the following formula on at least one of the substrates,

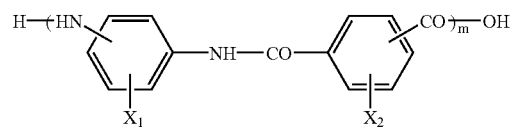

wherein substituent $X_1$ is selected from the group consisting of H, F, Cl, CN, $CF_3$, $OCF_3$, $C_nH_{2n+1}$, and $OC_nH_{2n+1}$, substituent $X_2$ is selected from the group consisting of F, Cl, CN, $CF_3$, $C_nH_{2n+1}$, and $OC_nH_{2n+1}$, where n is a number between 1 and 10 and m is about 50 to 500.

10. The liquid crystal display device of claim 9, wherein the alignment film further comprises:
    phenylenediamine based material; and
    phthalic acid based material,
    wherein each of the phenylenediamine based material and phthalic acid based material comprise at least one isomer configuration selected from the group consisting of 1,3- and 1,4-isomer configurations, wherein a ratio of 1,4- to 1,3-isomers ranges between 0% and 100%.

11. A method for fabricating a liquid crystal display device, comprising:
    preparing a first substrate and a second substrate;
    forming an alignment film having a polyphenylenephthalamide based material on at least one of the substrates, wherein the polyphenylenephthalamide based material is a product of a phenylenediamine based material reacted with phthaloyl chloride based material, the phthaloyl chloride based material characterized by the formula,

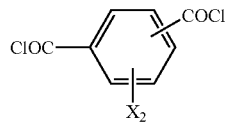

wherein $X_2$ is at least one selected from the group consisting of F, Cl, CN, $CF_3$, $OCF_3$, $C_nH_{2n+1}$, and $OC_nH_{2n+1}$, where n is a number between 1 and 10;

irradiating the alignment film with UV light; and forming a liquid crystal layer between the first and second substrates.

12. The method of claim 11, wherein the preparing a first substrate comprises:

forming a thin film transistor on the first substrate; and forming a pixel electrode on the first substrate.

13. The method of claim 11, wherein the preparing a second substrate comprises:

forming a black matrix on the second substrate; and forming a color filter layer on the second substrate.

14. The method of claim 11, further comprising irradiating the alignment film with the light at least one time.

15. The method of claim 11, further comprising controlling an alignment direction and a pretilt angle of the liquid crystal layer with the light.

16. The method of claim 11, wherein forming the alignment film comprises reacting a phenylenediamine based material with a phthaloyl chloride based material.

17. The method of claim 16, further comprising obtaining the phthaloyl chloride based material from a phthalic acid based material.

18. The method of claim 17, wherein each of the phenylenediamine based material and phthalic acid based material comprise at least one isomer configuration selected from the group consisting of 1,3- and 1,4-isomer configurations, wherein a ratio of 1,4- to 1,3-isomers ranges between 0% and 100%.

* * * * *